Aug. 15, 1939.     H. SALEY     2,169,928
GAMBREL
Filed April 11, 1938
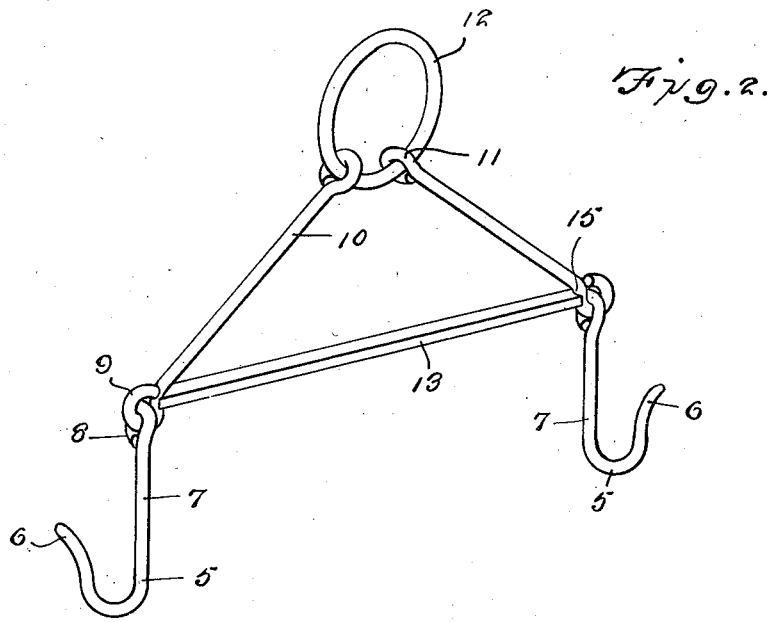
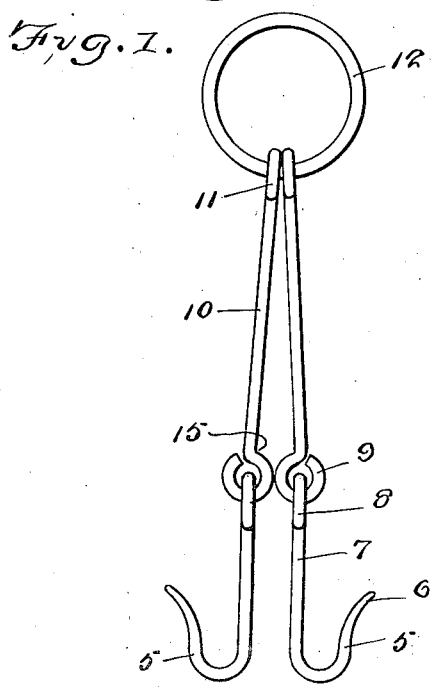
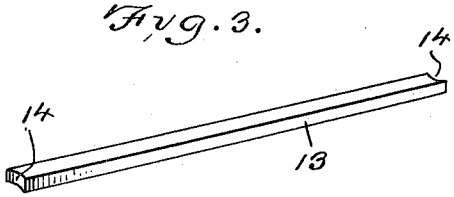
Henry Saley
INVENTOR
BY *Victor J. Evans & Co.*
ATTORNEYS Patented Aug. 15, 1939

2,169,928

UNITED STATES PATENT OFFICE 2,169,928

GAMBREL

Henry Saley, Blue River, Wis.

Application April 11, 1938, Serial No. 201,377

1 Claim. (Cl. 294—79)

The invention relates to dressed hog and beef hangers and more especially to gambrels.

The primary object of the invention is the provision of a device of this character, wherein hogs, steers or other hoof animals can be suspended, the device being susceptible of a determined range of adjustment for the carrying of different sizes of animals for the hanging and spreading of the same in a dressed condition or otherwise, the device being novel in the construction thereof and in the disposition and assembly of its parts.

A further object of the invention is the provision of a device of this character, wherein a spreader is releasably fitted therein thus assuring convenience in the handling of the hooks for the suspension of the animal and the subsequent spreading of the same.

A further object of the invention is the provision of a device of this character, which is simple in its construction, readily and easily handled, reliable and efficient in operation, susceptible of the suspension and spreading of animals of different weights and inexpensive to manufacture.

With these and other objects in view, the invention consists in the features of construction, combination and arrangement of parts as will be hereinafter more fully described, illustrated in the accompanying drawing, which discloses the preferred embodiment of the invention and pointed out in the claim hereunto appended.

In the accompanying drawing:

Figure 1 is an elevation of the gambrel constructed in accordance with the invention having the spreader element removed.

Figure 2 is a perspective view of the gambrel showing the spreader element associated therewith.

Figure 3 is a perspective view of the spreader element.

Similar reference characters indicate corresponding parts throughout the several views in the drawing.

Referring to the drawing in detail, the gambrel constituting the present invention comprises a pair of hooks 5, each having the outwardly curved bill 6, and the elongated stem 7 terminates in an eye 8. Loosely engaged with the eyes 8 are the eye terminals 9 of suspension links 10, the other terminal eyes 11 of which are loosely engaged upon a hanger ring 12 so that the gambrel is possessed of maximum flexibility for spreading and contracted relationship of the hooks 5 in the use thereof.

Removably insertable between the links 10 is a spreader element 13, it having the notched ends 14, these accommodating the eye terminals 9 of the links 10 for the seating of the bights 15 of said eye terminals within the notches and this element 13 functions to maintain the hooks 5 in a spread relationship to each other so that when the said hooks are engaged with the hind legs of a hog or other animal the spread of the latter is assured.

The bills 6 of the hooks 5 assure easy insertion thereof in the hind legs of the hog or other animal for the suspension or hanging of the same in the use of the gambrel.

What is claimed is:

A gambrel comprising a hanger ring, a pair of links loosely connected to said ring for spreading relation to each other, terminal eyes formed from said links at their ends remote to the ring and being turned downwardly, outwardly, upwardly and inwardly in the same plane with the longitudinal extent of said links, seating bights at the inner sides of the said links next to the terminal eyes, hooks loosely suspended from said terminal eyes and having out-turned bills, and a straight bar forming a spreader element and having notched ends releasably interfitting the seating bights when disposed between the said links for latching engagement therewith and holding the said links spread relative to each other.

HENRY SALEY.